United States Patent [19]
Dunn et al.

[11] Patent Number: 5,811,048
[45] Date of Patent: Sep. 22, 1998

[54] PROCESS OF AND APPARATUS FOR HOMOGENIZING A FLOW STREAM

[75] Inventors: Rodney G. Dunn, Christiansburg, Va.; David R. Treacy, Jr., Elmira; Michael E. Zak, Canandaigua, both of N.Y.

[73] Assignee: Corning Incorporated, Corning, N.Y.

[21] Appl. No.: 848,739

[22] Filed: May 22, 1997

Related U.S. Application Data

[60] Provisional application No. 60/019,984, Jun. 17, 1996.

[51] Int. Cl.$^6$ ............................ B29C 47/12; B29C 47/44
[52] U.S. Cl. .............................. 264/177.11; 264/177.12; 264/211.11; 264/211.23; 264/349; 425/190; 425/197; 425/200; 425/204; 425/382.4; 425/461
[58] Field of Search ............................ 264/177.11, 177.12, 264/211.11, 211.21, 211.23, 349; 425/190, 197, 200, 204, 382.4, 461

[56] References Cited

U.S. PATENT DOCUMENTS

| | | | |
|---|---|---|---|
| 2,771,636 | 11/1956 | McIntosh et al. | 425/185 |
| 3,609,806 | 10/1971 | Schippers et al. | 425/197 |
| 3,790,654 | 2/1974 | Bagley et al. | 264/177.11 |
| 3,885,977 | 5/1975 | Lachman et al. | 501/80 |
| 3,888,963 | 6/1975 | Orso et al. | 264/211.11 |
| 3,911,073 | 10/1975 | Charles-Massance | 264/171.1 |
| 3,986,816 | 10/1976 | Gwinn et al. | 425/188 |
| 4,150,932 | 4/1979 | Moghe | 425/197 |
| 4,500,603 | 2/1985 | Freundlich | 428/409 |
| 4,541,982 | 9/1985 | Upmeier | 264/349 |
| 4,551,295 | 11/1985 | Gardner et al. | 264/177.11 |
| 5,221,504 | 6/1993 | Capelle | 264/211.23 |

OTHER PUBLICATIONS

Chemineer, Inc., "Kenics Static Mixers", Bulletin 800, pp. 1–11 (1995).
KOMAX Systems, Inc., "Static Mixing Technology", pp. 1–16 (1994).
KOMAX Systems, Inc., "KOMAX® Tools for Plastics Extrusion", 2nd edition, pp. 1–19 (undated).
KOMAX Systems, Inc., "L–H Distribution Head", Bulletin L–H 001 (undated).
KOMAX Systems, Inc., "KOMAX Heat Exchanger" (undated).
KOMAX Systems, Inc., Komax® Motionless Mixers, Industry Bulletin No. 1016 (undated).
Vol. 016, No. 434 (M–1308), 10 Sep. 1992 & JP 04 148914 A (Sharp Corp.), 21 May 1992, abstract.

*Primary Examiner*—Leo B. Tentoni
*Attorney, Agent, or Firm*—Kees van der Sterre

[57] ABSTRACT

A method and apparatus for homogenizing a flow stream of plasticized material supplied from an extruder, to reduce viscosity gradients causing defects in extruded products, wherein a flow inverting homogenizer positioned in the flow stream and incorporating a plurality of criss-crossing channels for simultaneously transferring portions of the flow stream from central to peripheral flow stream locations and other portions of the flow stream from peripheral to central flow stream locations.

7 Claims, 3 Drawing Sheets

PROCESS OF AND APPARATUS FOR HOMOGENIZING A FLOW STREAM

This application claims the benefit of U.S. Provisional Application No. 60/019,984 filed Jun. 17, 1996 entitled FLOW INVERTING HOMOGENIZER ASSEMBLY, by Rodney G. Dunn, David R. Treacy, and Michael E. Zak.

BACKGROUND OF THE INVENTION

The present invention relates to apparatus for extruding ceramic products and more particularly to apparatus for extruding finely structured ceramic parts such as ceramic honeycomb structures at increased rates and with fewer structural defects.

A twin screw method for extruding structures of complex cross-section from plasticized mixtures of inorganic powders and suitable binders is disclosed in U.S. Pat. No. 4,551,295 to Gardner et al. In this process a batch mixture consisting of inorganic clay, talc and alumina powders is combined with organic binders and water, and the resulting mixture is plasticized in the extruder. The plasticized batch mixture is then fed to a honeycomb extrusion die mounted on the end of the extruder.

The use of perforated homogenizer or so-called breaker plates in extrusion apparatus, to control backpressure in the screw section and/or to support screens for removing aggregates from the flow stream is also known. U.S. Pat. No. 2,771,636 describes such use for polymer extrusion from a single-screw extruder, while U.S. Pat. No. 3,888,963 discloses a similar homogenizer for use in the ram extrusion of honeycomb ceramics.

Also described in the latter patent is a flow homogenizer having a mixing function, that homogenizer incorporating angularly disposed flow passages rather than flow passages parallel to the direction of extrusion. This flow homogenizer is intended to promote localized mixing of the batch material as it is introduced into a tapered compaction chamber upstream from the extrusion die.

Characteristic of the process of U.S. Pat. No. 4,551,295 above is the extensive working of the extrudable powder mixture which occurs as the mixture is plasticized within the extruder. Thorough working of the blend of inorganic powders, water and organic binder materials is required in order that a truly homogeneous plasticized batch be provided. For most efficient working a co-rotating twin screw extruder is typically employed, the action of the twin screws in these extruders being a particularly effective means for converting rotational energy to high shear mixing.

A fundamental difficulty with the adaptation of screw extrusion processes to the production of finely structured ceramics is that of uneven mixing, which tends to produce a plasticized mixture of uneven viscosity. One by-product of the mixing process is the generation of heat within the plasticized batch. With most organic binder systems currently employed in these processes, this heat causes a change in the viscosity of the batch, for example reducing batch viscosity within domains of higher temperature within the mixture. Uneven mixing also generates zones of cumulative-shear non-uniformity (i.e., zones of differing shear history) within the batch, with the more extensively sheared zones tending to exhibit lower viscosity than other zones within the mixture. Because the batch is not evenly heated and includes regions of differing shear history, some portions of the batch fed to the extrusion die will be relatively stiff and difficult to extrude, while other, softer portions of the batch will extrude more rapidly. In fact, both of these effects tend to decrease viscosity and increase extrusion rate at the center of the flow stream traversing the extrusion die, relative to viscosity and extrusion rate around the periphery of the flow stream.

As the industry has strived to increase production and decrease the cost of producing extruded ceramic honeycombs, much effort has been focussed on measures to increase the rate of extrusion of ceramic batch materials. Unfortunately, attempts to increase production from twin-screw extruders through the use of higher extruder operating speeds cause larger temperature and shear disparities within the batch, such that extrusion rates for batch materials in central (axial) portions of the flow stream increase much more rapidly than the rates for peripheral portions of the flow stream. Product defects such as "wiggly" webs and/or product contour distortion at the front faces of the extruded structures thus increase markedly at such speeds.

Other adverse consequences of higher extruder operating speeds can include more persistent residual patterning effects from the otherwise normal flow disruptions introduced into the flowing batch material by conventional screening or homogenizing apparatus. At more conventional rates of extrusion these patterning effects are not a problem because the patterns are erased as the batch material passes through the extrusion die.

Controlling batch temperature and maintaining batch temperature uniformity are in fact problems endemic to the twin-screw ceramic extrusion process. Many proposals to address these problems have been made, one of which has been to simply operate the extruder at slower screw speeds, to allow for temperature equilibration of the batch. However, such speed reductions are uneconomical in today's markets because they reduce process throughput. Yet, as suggested above, higher speed extruder operation also results in reduced throughput because of the increased incidence of shape distortion in the extruded products.

A number of other measures to alleviate the effects of uneven batch heating and the resulting product defects have been tried, including approaches such as cooling the extruder barrel and/or screws during processing, changing batch feed rates, changing extruder screw design, and changing process set points. In general, however, none of these attempts has been successful in providing a truly thermally homogeneous batch.

It is evident from a study of the above process constraints that an extrusion method which would permit the more rapid production of extruded products, without increasing batch temperature inhomogeneities and/or uneven batch viscosities and extrusion rates, would have significant economic value.

It is therefore a principal object of the present invention to provide extruder apparatus which improves temperature homogeneity and viscosity uniformity in extruder-processed plasticized powder batch materials.

It is a further object of the invention to provide extrusion apparatus and an extrusion method which permit the use of faster extruder screw speeds and higher extrusion rates without increasing the susceptibility of the extruded preforms to distortion or damage after extrusion.

Other objects and advantages of the invention will become apparent from the following description thereof.

SUMMARY OF THE INVENTION

The invention provides extrusion apparatus and a method for extruding plasticized inorganic powder batches offering a significant improvement in the thermal homogeneity of a plasticized batch material to be delivered to an extrusion die or other batch shaping means. The result of this improvement is that a more uniformly viscous plasticized batch material, exhibiting a more uniform flow into and/or through a die or other shaping means, can be attained.

As noted above, the difficulties associated with high speed extruder operation in the prior art have resulted largely from excessive heating of central portions of the flow stream, causing unacceptably low viscosity, coupled with significantly lower temperatures in peripheral portions the batch stream resulting in undesirably high viscosity. The objectives of the invention are achieved through the use of extrusion apparatus comprising an improved flow homogenizer upstream of the extrusion die, which homogenizer effects a cross-transfer of substantial masses of batch material from central toward peripheral portions, and from peripheral toward central portions, of the batch flow stream. This mixing or cross-transfer is effective in overcoming the problems associated with uneven batch heating in twin screw extrusion processes, and other extrusion processes as well.

In a first aspect, then, the apparatus of the invention is a modification of a conventional extruder, the latter typically comprising a screw section containing one or more rotatable screws within a barrel for mixing and transporting or pumping extrudable material, such as a plasticized inorganic powder mixture, through the extruder. The extruder supplies a flow stream of the plasticized inorganic powder mixture to an extrusion die or other forming means located downstream from the extruder screw or screws, typically attached to or otherwise positioned at the outlet end of the extruder.

In accordance with the invention the apparatus further comprises an improved homogenizer termed a flow inverting homogenizer, that homogenizer having the form of a plate or other body disposed in the flow stream between the upstream screw section and the downstream forming means of the extruder. For purposes of the present description the terms "upstream" and "downstream" are applied to locations, directions, or components of the extrusion apparatus herein disclosed, in order to define positions relative to the direction of flow of the stream of extrudable batch material through the extruder.

The flow inverting homogenizer of the invention includes an upstream face, a downstream face, and a plurality of through-channels traversing the homogenizer between the upstream and downstream faces. The channels include a first plurality of divergent channels and a second plurality of convergent channels. Each divergent channel has an inlet opening in a central portion of the upstream face of the flow inverting homogenizer and a discharge opening in a peripheral portion of the downstream face of the homogenizer, for transferring a portion of the plasticized batch mixture from a central toward a more peripheral path within the batch flow stream.

Each of the convergent channels in the homogenizer has an inlet opening in a peripheral portion of the upstream face and a discharge opening in a central portion of the downstream face, thus acting to transfer a portion of the batch mixture from peripheral towards more central or axial paths within the batch flow stream. Thus the homogenizer is designed to effect a mass cross-transfer of batch material entirely within the flow stream and in a relatively short section of the extruder between the screw section and the die or other forming means provided in conjunction therewith.

In a second aspect, the invention includes a method for homogenizing a flow stream of a plasticized inorganic powder batch mixture to be delivered from the screw section of an extruder to forming means such as an extrusion die disposed downstream therefrom. That method comprises transferring first portions of the plasticized powder batch mixture from peripheral to more central flow paths within the flow stream, and concurrently transferring second portions of the mixture from central to more peripheral locations in the flow stream. This process of cross-transferring portions of the plasticized batch, i.e., exchanging locations for portions of the plasticized batch, introduces higher temperature, more highly sheared, centrally flowing batch material to cooler peripheral flow paths, and vice versa. Thus cross-transfer is very effective in achieving substantially improved thermal and shear history homogeneity in the batch flow stream prior to delivering the batch to an extrusion die or other forming means for shaping the batch into final product or preform configurations.

The flow inverting homogenizer of the invention can be used as the sole means for batch homogenization in the extruder, or it can be used in combination with other mixing or screening hardware of the kind presently used in the art for improving the quality and uniformity of an extrusion batch prior to forming by a mold or die. Examples of such optional hardware, which can be positioned upstream and/or downstream of the flow inverting homogenizer in the batch flow stream, include conventional homogenizing or breaker plates, particle screens, screen support plates, stip plates, and flow area restrictor plates. A particularly preferred combination according to the invention, as hereinafter more fully described, is a combination of a screen support-homogenizer plate and screen positioned immediately upstream of the flow inverting homogenizer.

DESCRIPTION OF THE DRAWINGS

The invention may be further understood by reference to the drawings wherein.

DETAILED DESCRIPTION

Figure 1:
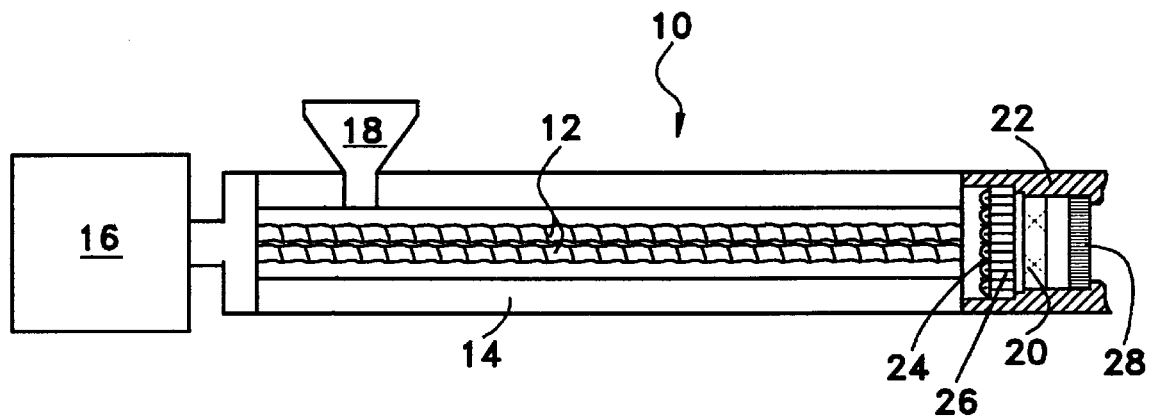
FIG. 1 schematically illustrates a screw extruder incorporating a flow inverting homogenizer in accordance with the invention.

As will be apparent from the description of the invention provided herein, the method and apparatus of the present invention have application in any of a wide variety of screw or ram extrusion processes. Thus any extrusion process wherein temperature or shear history variations across a flow stream or other charge of extrudable batch material could cause viscosity variations adversely affecting the forming properties of the batch will benefit from flow inversion as herein described, at least from the standpoint of improved viscosity homogeneity of the batch. However, since the invention can be used to particular advantage in the twin-screw extrusion forming of cellular honeycomb structures, for example as described in U.S. Pat. Nos. 3,790,654, 3,885,977 and 4,551,295, the following description will refer specifically to those processes even though the invention is not limited in its application thereto.

The flow inversion provided by the flow homogenizer of the invention has proven surprisingly effective in achieving equilibration of both the temperature and viscosity of the batch stream in these twin-screw extrusion processes. That effectiveness is demonstrated by the fact the homogenizer has enabled a significant increase in the feed rate of the batch through the extruder, with equal or superior quality in the ware being extruded.

Through the use of this apparatus, most of the deformation problems relating to differential center flow, including patterned shadows or swollen webs in the extruded products, have been essentially eliminated. Further, these product defects do not reappear even as extrusion rates significantly higher than customarily used in these processes are attempted. Thus, with proper design of the homogenizer, the cross-transfer of batch material within the flow stream is sufficiently extensive that any residual temperature gradients or batch flow inhomogeneities within the flow stream are not large enough to cause noticeable deformations in the structures extruded from the dies. This result is particularly unexpected in view of the difficulty of extruding defect-free fine honeycomb structures even from powder batches not subjected to rapid plasticization processing.

As already noted, the flow inverting homogenizer of the invention as hereinabove described finds particular application in extruders of single-screw or, more preferably, twin-screw design. A schematic cross-sectional elevational view of an extruder of twin-screw design is schematically illustrated in FIG. 1 of the drawing.

Referring more particularly to FIG. 1, extruder 10 includes a screw section comprising two extruder screws 12 disposed within a barrel 14, the screws being driven by motor 16 at the inlet end of the barrel. Barrel 14 is provided with inlet port 18 for introducing batch material to be mixed and plasticized into the extruder.

A flow inverting homogenizer 20 positioned downstream of the screw section is contained within a cartridge 22 mounted on the outlet end of extruder barrel 14. Also disposed within cartridge 22 are screen 24 and screen support-homogenizer 26, these being located in front of or upstream of homogenizer 20 with respect to the flow direction of batch material being pumped from the screw section. Honeycomb extrusion die 28 is mounted downstream of the flow inverting homogenizer at the outlet end of the cartridge.

In the operation of this apparatus, plasticized batch material pumped from extruder barrel 14 by screws 12 passes first through screen 24 and screen support plate 26, then through flow inverting homogenizer 20, and finally out of the extruder as a honeycomb structure through honeycomb extrusion die 28.

Figure 2:
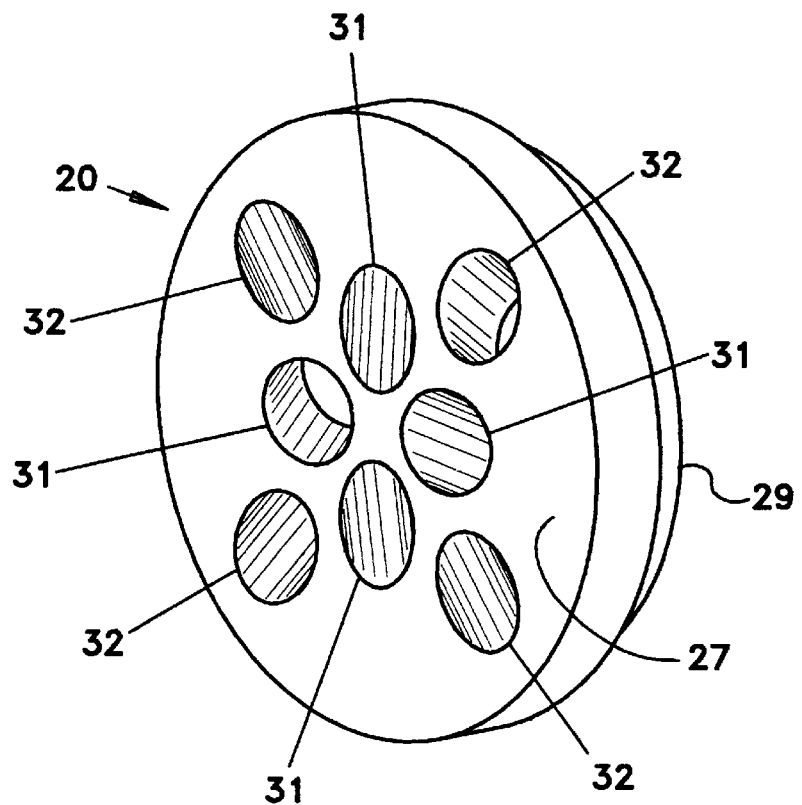
FIG. 2 is a schematic perspective view of a flow inverting homogenizer useful in the extruder of FIG. 1.

FIG. 2 of the drawing provides a schematic perspective view of a flow inverting homogenizer 20 of basic design. As shown in FIG. 2, homogenizer 20 is provided with a plurality of through-channels 31 and 32, those channels traversing the homogenizer from an inlet or upstream face 27 to an outlet or downstream face 29 of the homogenizer (not shown) located on the opposite side of the homogenizer body.

The channels in homogenizer 20 include a first plurality of centrally disposed, radially outwardly directed (diverging) channels 31. In the operation of the homogenizer, channels 31 transfer batch material impinging on central portions of upstream face 27 of the homogenizer from central or axial portions of the flow stream outwardly to peripheral positions within the flow stream exiting the homogenizer on downstream face 29 thereof.

The channels in homogenizer 20 further include a second plurality of peripherally disposed, radially inwardly directed (converging) channels 32, these channels being directed to channel batch material impinging on peripheral portions of upstream face 27 of the homogenizer from peripheral portions of the flow stream inwardly to axial or central positions within the flow stream exiting the homogenizer on downstream face 29 thereof. In the embodiment shown, converging channels 32 have approximately the same total cross-sectional area as diverging channels 31, so that volume of material transferred to central portions of the flow stream is approximately equal to the amount of material transferred to peripheral portions of the flow stream.

For purposes of the present description, central paths or flow stream portions within the flow stream passing the flow inverting homogenizer are paths or portions located between the flow stream center and one-half of the distance to the flow stream edge, i.e., at radial locations below R /2, where R is the radius of the flow stream. Peripheral positions or flow stream portions are those located at radial distances between R/2 and R from the flow stream center.

Figure 3:
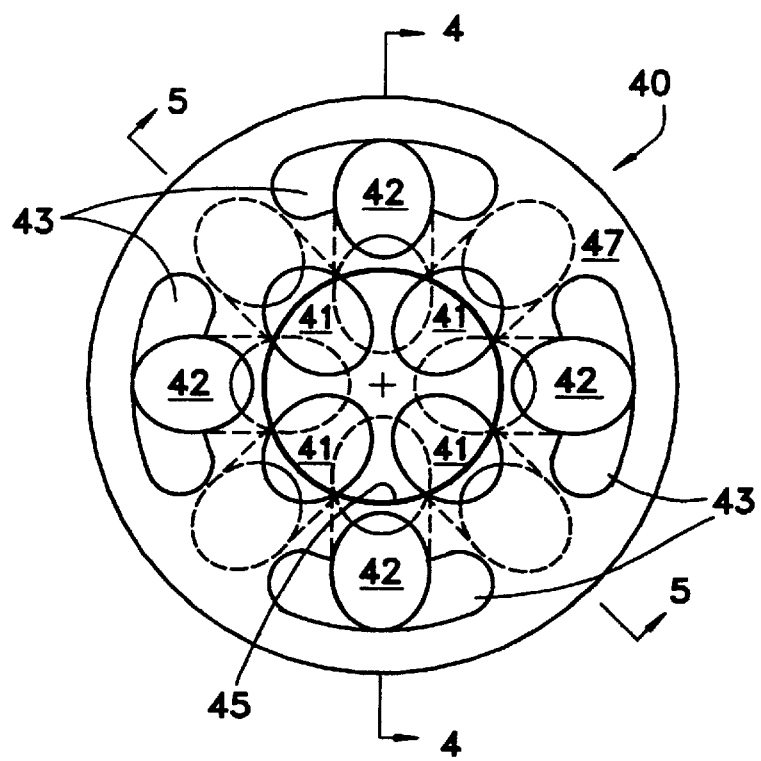
FIG. 3 is a schematic top plan view of a second embodiment of a flow inverting homogenizer useful in the extruder of FIG. 1.

Another example of a flow inverting homogenizer in accordance with the invention is shown in FIG. 3 of the drawing, which provides a schematic top plan view of such a homogenizer. Referring more particularly to FIG. 3, homogenizer 40 comprises a plurality of channels 42 opening at peripheral locations on upstream or inlet face 47 of the homogenizer. Channels 42 direct batch material from outwardly disposed portions of a flow stream impinging on inlet face 47 inwardly toward central portions of the flow stream exiting the homogenizer at outlets from channels 42 shown in phantom.

The homogenizer further comprises a plurality of channels 41 opening at centrally disposed locations on inlet face 47, channels 41 being disposed to direct batch material impinging on central portions of the inlet face in outward directions. Thus channels 41 transfer batch material to peripheral portions of the flow stream exiting the homogenizer at outlets from channels 41 on the opposite face of the homogenizer, shown in phantom.

Homogenizer 40 comprises additional features to improve the material cross-transfer efficiency of the apparatus design. These include relieved or recessed surface portions 43 on inlet face 47 of the homogenizer, located adjacent and at least partially recessing the inlets to each of the convergent channels 42. Recesses 43 help to collect and direct batch material impinging on peripheral portions of inlet surface 47 into channels 42, reducing back-feeding of that material into channels 41.

Also provided on inlet face 47 is relieved or recessed surface portion 45, that surface portion at least partly overlying and recessing the inlets to divergent channels 42. Recessed surface 45 helps to collect and direct batch material impinging on the central portion of inlet surface 47 into channels 41, reducing back-feeding of that material into channels 42.

Figure 4:
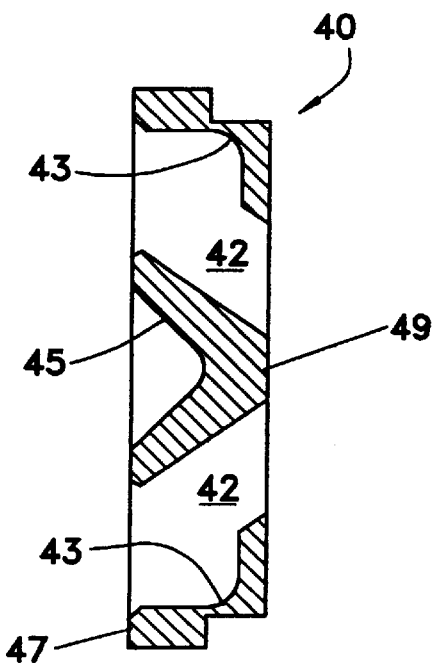
FIG. 4 is a schematic side cross-sectional view of the flow inverting homogenizer of FIG. 3.

FIG. 4 of the drawing is a schematic cross-sectional view of flow inverting homogenizer 40 along line 4—4 of FIG. 3. More clearly shown in FIG. 4 are relief surfaces 43 and the orientations of inwardly directed channels 42, those channels traversing flow inverting homogenizer 40 from an outward location on inlet face 47 thereof to a more central location on downstream or outlet face 49 thereof.

Figure 5:
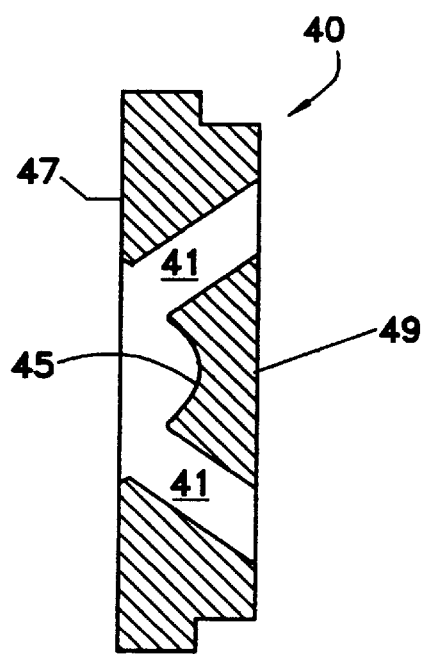
FIG. 5 is a second schematic side cross-sectional view of the flow inverting homogenizer of FIG. 3.

FIG. 5 of the drawing sets forth a schematic cross-sectional view of flow inverting homogenizer 40 along line 5—5 of FIG. 3. That figure shows the disposition of recess 45 as well as the orientation of outwardly directed channels 41, the latter traversing homogenizer 40 from central locations on inlet face 47 to more peripheral locations on downstream face 49 thereof.

Figure 6:
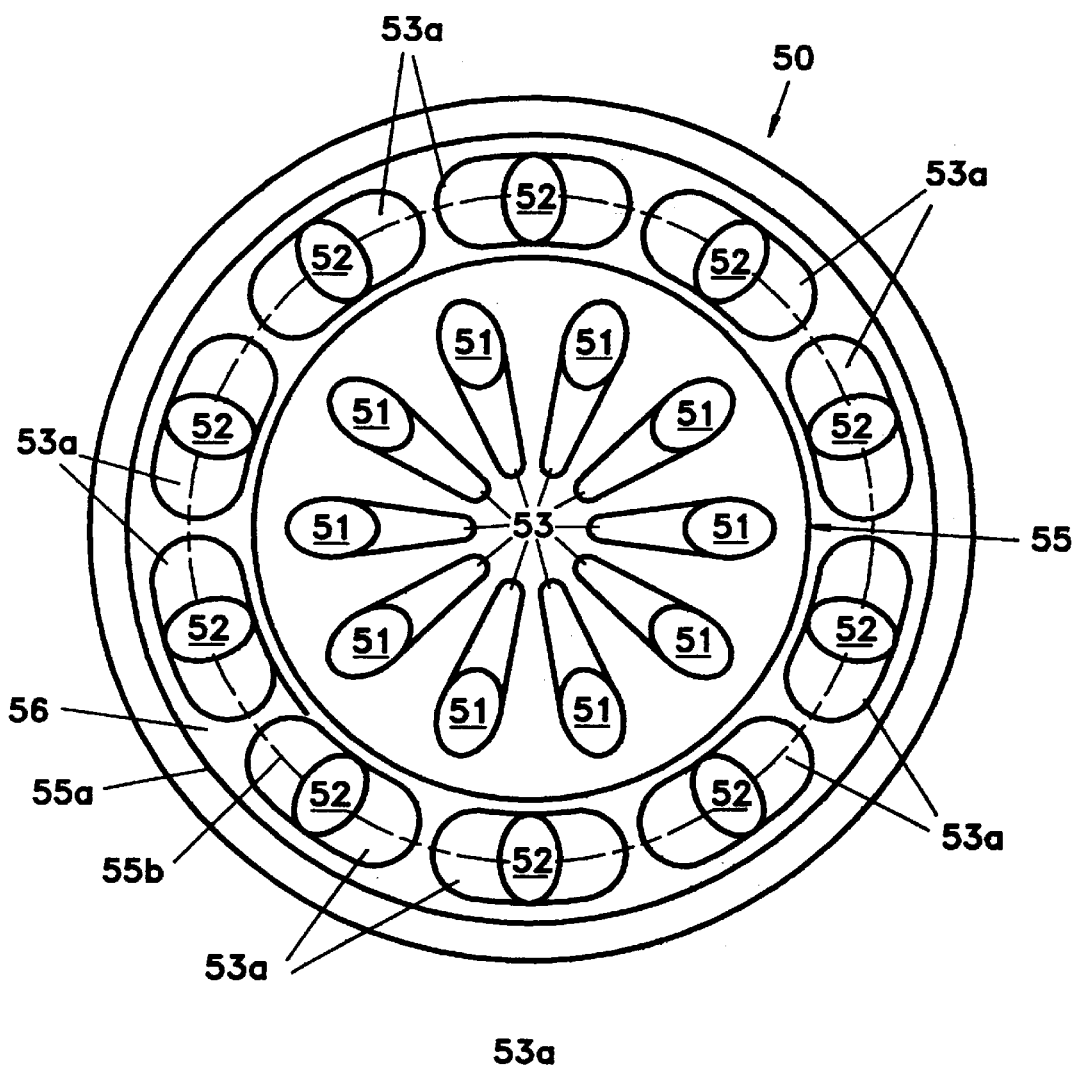
FIG. 6 is a schematic top view of a third embodiment of a flow inverting homogenizer useful in the extruder of FIG. 1.

Yet another design for a flow inverting homogenizer in accordance with the invention is set forth in FIG. 6 of the drawing, which is a schematic top plan view of the upstream or inlet surface of the homogenizer. As shown in FIG. 6, homogenizer 50 features a larger number of flow channels than the homogenizer of FIG. 3., including 10 divergent channels 51 alternating with 10 convergent channels 52.

An important aspect of the design of homogenizer 50 is that it equalizes the area of the portion of the inlet surface inside boundary line 55, intended to supply channels 51, with the area of the inlet surface outside of boundary 55, intended to supply channels 52. Edge flowing batch stream portions impinging on points outside of boundary 55 will tend to flow toward convergent channels 52, with decreased likelihood of entering divergent channels 51. The remainder of the batch stream will then be constrained to enter divergent channels 51.

At least regions 53 and 53a adjacent channels 51 and 52, respectively, are recessed, recesses 53 and 53a helping to collect and direct portions of the flow steam impinging thereon into their respective associated channels 51 and 52. In the particular embodiment shown, an additional recess in the inlet surface of homogenizer 50 is provided as a circumferential v-groove 56, bounded on its inward edge by boundary 55, on its outward edge by boundary 55a, and with its apex following groove centerline 55b. This v-groove is superimposed on and connects recessed portions 53a, acting to further reduce any tendency for edge-impinging batch stream portions to enter centrally located divergent channels 51.

A key functional characteristic of the flow inverting homogenizers of the invention, derived from the arrangement of multiply directed channels within a single body, is the advantageous effect of a simultaneous large-scale cross-transfer of batch material within a continuous flow stream. It will be evident that, for this purpose, the channels do not all have to be contained within a solid structure, although this is strongly preferred. Assemblies of crisscrossing tubes between opposing manifold plates, or other structures designed to effect approximately a one-for-one cross-transfer of roughly equivalent volumes of material within a flow stream, could alternatively be used. The essential requirement is to secure a cross-distribution of significant volumes of batch material over a single continuous length of flow path in order that an orderly exchange of high-temperature for low-temperature material in the continuous extrusion environment may be achieved. Assuming substantially equivalent convergent and divergent channel cross-sectional areas, viscosity homogenization can be improved without the need to induce turbulent flow to force adequate mixing.

Another important feature of the homogenizers of the invention is that of channel size, which directly impacts the proportion of the flow stream subjected to flow path realignment. For useful homogenization it is considered that the aggregate cross-sectional area of the channels (the sum of the individual channel cross-sections) in the array should constitute at least 10% of the total cross-sectional area of the flow stream impinging upon the homogenizer, the flow stream cross-sectional area being considered to be substantially the area of the upstream face of the homogenizer. More desirably, an aggregate channel cross-sectional area constituting 15–30% of the flow stream cross-section will be provided. While in general the reduction in viscosity gradient across the flow stream will be approximately proportional to the volume of material exchanged, other factors, such as the effectiveness of the homogenizer design in preventing undesirable upstream crossfeeding of axial flow-stream segments back into convergent (axially directed) homogenizer channels, are expected to be equally important.

Flow inverting homogenizers provided in accordance with the invention can also be characterized in terms of an inversion effectiveness factor, a factor reflecting the magnitude of the radial displacement of material toward or away from the center axis of the flow stream effected by the homogenizer. Larger transfer factors result in lower residual thermal/viscosity gradients in the homogenized batch. That is, since the coolest, most viscous segments of the flow stream impinging on the upstream face of the homogenizer are those closest to the extruder barrel, and since the warmest, least viscous segments are on the flow stream axis, the largest practicable radial repositioning of each of these segments of the flow stream is generally desired.

The inversion effectiveness factor $E_i$ of a homogenizer can be calculated from the expression:

$$E_i = \frac{t \cdot \tan\theta}{r}$$

where t is the thickness of the homogenizer plate, $\theta$ is the larger of the angles of the convergent and divergent homogenizer channels with respect to the flow axis of the batch stream (usually but not necessarily the same), and r is the radius of the flow stream from the screw section (the largest radius in the case of oval or other non-circular streams) impinging upon the homogenizer.

The inversion effectiveness factor is practically limited by considerations relating to homogenizer plate strength, flow impedance, and channel wear rate, each of which will impact the channel sizes, channel angles and plate thicknesses selected. However, effectiveness factors of at least about 0.25, more typically 0.3–0.5 are practically attainable and these are the values which will normally be selected for best results.

As previously noted, flow homogenization in accordance with the invention can be carried out without requiring any screening, mixing or other processing of the batch stream, if desired. However, while not suitable as a screen support itself, the flow inverter can be very effectively employed to add support to a screen and screen support plate disposed in the batch flow stream, the latter normally being required in any case to properly screen and condition the batch for extrusion through the downstream extrusion die.

A particularly preferred flow inverting assembly for high speed extruder operation in accordance with the invention is a combination of the flow inverting homogenizer with a thin, highly perforated homogenizer/screen support plate, the latter plate with its supported screen or screens being positioned against and just upstream of the flow inverting homogenizer in the flow stream from the screw section of the extruder. The screen support plate will most preferably comprise a plurality of small, closely spaced, parallel holes across the entire flow stream cross-section, the close spacing of the holes being enabled by the support to the plate offered by the adjacent homogenizer.

The invention may be further understood by reference to the following example of the operation thereof.

EXAMPLE

A twin-screw extruder used in routine commercial production for the manufacture of cordierite (MgO-Al2O3-SiO2) ceramic honeycomb structures from a plasticized batch mixture comprising clay, talc, alumina, organic additives, and water is selected for modification. This extruder is retrofitted with a cartridge incorporating a flow inverting homogenizer assembly substantially as shown in FIG. 1 of the drawing.

The flow inverting homogenizer employed in the cartridge assembly has a structure corresponding to that schematically illustrated in FIG. 3 of the drawing, comprising 8 cross-flow channels having an aggregate channel cross-sectional area comprising about 25% of the cross-sectional area of the flow channel through the cartridge. The inversion effectiveness factor of the homogenizer is about 0.29.

Positioned in the cartridge upstream of the flow inverting homogenizer is a drilled screen support plate supporting a screen assembly to remove particulates from the batch flow stream. The screen support plate incorporates a plurality of 6.3 mm (diameter) holes drilled in a closely spaced triangular hole pattern across the entire cross-section of the flow channel. The die mounted at the outlet end of the cartridge is the same die as is used for conventional commercial production.

Installation of the described flow inverting homogenizer assembly provides a significant improvement in the production capacity of the extruder. During extruder operation without the assembly, increasing the speed of extruder operation to provide a doubling of the honeycomb extrusion rate increases the typical defect rate for viscosity-related honeycomb defects such as "wiggly webs" by approximately 100%. With the assembly in operation, however, and maintaining double the standard extrusion rate, the defect rate is reduced to less than 10% of the typical defect rate incurred at standard speeds, and less than 5% of the defect rates encountered when operating the extruder at the higher extrusion rates without the flow inverting assembly installed.

We claim:

1. Extrusion apparatus comprising, in combination:
   (a) twin screw extruder means for providing a flow stream of a plasticized inorganic powder mixture to a honeycomb extrusion die positioned downstream of the extruder means; and
   (b) a flow inverting homogenizer positioned in the flow stream between the forming means and the extruder means, the flow inverting homogenizer comprising:
      (i) a body comprising an upstream face, a downstream face, and a plurality of through-channels traversing the body between the upstream and downstream faces, the through channels consisting essentially of a first plurality of divergent channels originating on the upstream face at central locations within the flow stream and being directed toward peripheral locations within the flow stream on the downstream face, and a second plurality of convergent channels originating on the upstream face at peripheral locations within the flow stream and terminating on the downstream face at central locations within the flow stream; and
      (ii) the plurality of through-channels having an aggregate cross-sectional area constituting at least 10% of the cross-sectional area of the upstream face of the flow inverting homogenizer.

2. Apparatus in accordance with claim 1 which further comprises a perforated screen support plate positioned against and upstream of the flow inverting homogenizer.

3. A method for reducing the viscosity inhomogeneity of a flow stream of a plasticized inorganic powder batch mixture supplied from the screw section of a twin-screw extruder to a honeycomb extrusion die positioned downstream of the screw section which comprises:
   (a) transferring first portions of the plasticized powder batch mixture from central flow paths toward peripheral flow paths within the flow stream, and concurrently transferring second portions of the mixture from peripheral flow paths to central flow paths within the flow stream;
   (b) the transfer being effected by means of a flow inverting homogenizer body comprising an upstream face, a downstream face, and a plurality of through-channels traversing the body between the upstream and downstream faces, the through-channels consisting essentially of a first plurality of divergent channels originating on the upstream face for transferring the first portions of the flow stream and a second plurality of convergent channels originating on the upstream face for transferring the second portions of the flow stream, and
   (c) the plurality of through-channels having an aggregate cross-sectional area constituting at least 10% of the cross-sectional area of the upstream face of the body.

4. A method in accordance with claim 3 wherein the flow inverting homogenizer has an inversion effectiveness factor of at least 0.25.

5. Extrusion apparatus in accordance with claim 1 wherein the plurality of convergent channels have an aggregate cross-sectional area substantially equivalent to the plurality of divergent channels.

6. Extrusion apparatus in accordance with claim 1 wherein the plurality of through-channels has an aggregate cross-sectional area constituting 15–30% of the cross-sectional area of the upstream face of the flow inverting homogenizer.

7. Extrusion apparatus in accordance with claim 1 wherein the flow inverting homogenizer has an inversion effectiveness factor of at least 0.25.

* * * * *